(12) United States Patent
Preston

(10) Patent No.: X7472
(45) Date of Patent: Mar. 8, 1833

(54) BOOTS & SHOES, PEGGED

(76) Inventor: Samuel Preston

Samuel Preston. — Letters Patent.

The schedule referred to in the letters patent and making part of the same con=
taining a description in the words of the said Samuel Preston of his improve=
ment in the machinery for making Boots and Shoes and finishing the same
with pegs of wood or metal ——— ——— ——— ———

---

To all to whom it may concern. Be it known that I Sam=
uel Preston of Danvers in the County of Essex in the State of Massachusetts
have invented a machine for making shoes and finishing the same with
pegs either of wood or metal and that the following is a full and exact
description of the same ———

——— The frame of the machine may be of wood or other material
of sufficient strength with a platform which may be conveniently placed a=
bout two and a half feet from the floor on which it stands a space
being left for the passage of the shoe carriage and the working of the awls
and peg drivers to be presently described ———

——— On either side of the vacant space in the centre rise columns
or uprights usually of iron and these are connected at the top by a
crosspiece. These uprights form a traverse way or guides for the ham-
mer, and through these an arbor passes turning in boxes fitted
into the uprights. The arbor has fixed to it in the centre between the
column the cam or lifter which raises the hammer once at each revolu-
tion of the arbor. on either end of the arbor on the outside of the upright
is a crank and band wheel for the purpose of communicating motion to the
intermitters and the application of the moving power is likewise made to
this arbor. The cam or lifter fixed on the center of the arbor revolves against
a friction wheel in the top piece of the hammer frame. The cam first strikes
the friction wheel near to the arbor, on which it is fixed but diverging
as it revolves it carries up the hammer to its extreme point whence it
falls: thus producing one blow at each revolution of the arbor ...

——— The hammer face is of sufficient dimensions to cover the four pistons (hereafter described) at their greatest distance from each other and
and is kept in its proper position by a groove in either side of it fitting on
to the fillets on the sides of the uprights. The hammer rises and may be
acted upon at its greatest elevation by a spiral or other spring under
the top of the cross piece, the power of which added to its own gravity brings
down the hammer with a smart blow on the heads of the piston ———

——— The Last is placed bottom upwards on the carriage and is sunk nearly
to the sole; it has underneath it a crank or other contrivance attached to
a screw which enters a nut in the instep of the last, by which means
the shoe and last are confined to the socket fitted for their reception. The car=
riage travels in a right line on a railway or slides resting on four
x feet or guides fitted for the purpose: the carriage is forced forward by
what I denominate intermitters which are wheels having on their pe=
ripheries spiral threads which mesh into racks on the side of the
carriage which during each revolution of the arbor is a part of the
time in motion and a part of the time at rest. While the hammer is rising
the carriage moves but remains at rest a sufficient time to receive
the blow of the hammer and for the awls and pegdrivers to return to their resting
places. In a shoe requiring two rows of pegs, four awls and four pegs are
driven at each blow of the hammer, the pegs being always driven into
the holes made at the last preceding blow of the hammer, two awls being
set in each of the awl pistons and two pegdrivers in each of the drivers
pistons all of which receive the same blow. A gauge is likewise fixed to
each piston which is forced into a groove or former which gives the
piston carriages the side movement necessary to make the pegging con=
form to the shape and size of the last ———

——— The feet or guides of the carriage are grooved to fit the
rails on which they run. Both these and the rails may be of iron, steel
or other metal so firmly bedded that they may receive the blow of the ham=
mer without trembling ———

——— The lateral carriages in the ends of which are placed the pistons
may be about seven inches high, fifteen inches long and one inch thick in open= and intermitters occupy their assigned stations: that is at each succeeding blow the peg driver occupies the exact station which the awl occupied at the blow preceding it and consequently cannot fail of depositing the peg which it strikes in the hole made by the awl which was its leader ——

—— The racks on the sides of the shoe carriage have teeth of that degree of fineness which is necessary for the kind of work to be performed. The teeth being set, at the same distance from each other as is intended for the pegs in the shoe. The intermitter being so made as to mesh into them —— The intermitters being cut with a gain equal to a two threaded screw: on one half of its periphery and on a line with the motion of the wheel on the other half, or the threads may be entirely omitted on the other half: as the carriage whilst the wheel in passing over the space without a thread will necessarily remain at rest. The spirally threaded part, will take each succeeding tooth of the rack in its turn in the same manner as if the thread were continued on that space in a right line with the movement of the wheel, or if a gain equal to a three threaded screw be cut the carriage will be left at rest two thirds of the time. The operation of the intermitters on the shoe carriage is to give it motion at intervals. By the strait thread or the vacant space on the intermitters the shoe carriage is left at rest, a sufficient time during each revolution for the pistons to receive the blow of the hammer and for them to return to their resting places before the moving power exerts its influence again. Bands and [illegible] with band wheels and cranks connected or cog wheels in their stead serve to communicate motion in equal revolutions from the arbor to the intermitters ——

—— The cases in which the slips of peg wood properly fitted lie, may be firmly fixed at an angle of about 45° to the carriages of the peg driver pistons with one end directly under the piston and the peg drivers themselves moving in the ends of the cases. The slips of peg wood are put into the cases by hand and are forced against the end where the peg driver plies up and down by means of a weight, and pulley attached to a follower. In the end of the case where the peg driver plies at the distance of the width of one peg from [illegible] the bottom of the case is an edge or splitter about one eighth of [illegible]

chisels or cutters for the purpose of paring the edges of the sole by the descent of the piston, giving to them such a position as shall adapt them to this object.—

— I employ a paring wheel with revolving cutters for the purpose of completing the operation commenced by the cutters on the pistons. These cutters are to operate somewhat in the manner of those employed for cutting the wood in the machine for forming Lasts. The shoe may either be held in the hand or fixed upon a block with guides during this operation, For the purpose of smoothing the edges I use a wheel covered with emery, pounded glass, or other suitable material made and revolving in the manner of the common emery wheel employed by cutlers and others. From this I take it to what I call a rand file or edgers wheel having a smooth metalic face and furnished near with its periphery with edges like those of the common rand file. The polishing the shoe is then effected by means of a wheel furnished with cogs of hard wood or metal against which it is to be held and pressed —

— What I claim as my own invention in the within described apparatus is that arrangement, thereof by means of the intermitters or a single intermitter or other analogous contrivance with the guides and other appendages by means of which the shoe carriage is caused to advance with the shoe thereon whilst the pistons carrying the awls and drivers receive by means of guides or formers a lateral motion following the shape of the sole of the shoe whether the motion be effected precisely in the way described or in any other producing a similar result, I claim also the arrangement, of the parts of the machinery by which the pegs or nails are driven by one set of pistons in the holes made by the awls in the pistons by their preceding descent. I claim likewise the splitting of the peg from the end of a slip of peg wood or the cutting of the pegs or nails from a slip of metal and the instantaneous driving thereof into the proper places. I further claim the application of the paring apparatus upon the piston and also on the paring wheel and the method subsequently described of smoothing and polishing by means of revolving wheels Witnesses
[illegible] Wm P Jones — Joseph [illegible]

Samuel Preston

Recd & Recorded July 21 1858 2730